United States Patent [19]

Nicolay

[11] Patent Number: 4,884,291

[45] Date of Patent: Nov. 28, 1989

[54] X-RAY TELEVISION IMAGING USING DIGITAL CIRCULAR BLANKING

[75] Inventor: David Nicolay, Fairview Park, Ohio

[73] Assignee: Picker International, Inc., Cleveland, Ohio

[21] Appl. No.: 217,630

[22] Filed: Jul. 11, 1988

[51] Int. Cl.[4] .............................................. H05G 1/64
[52] U.S. Cl. ....................................... 378/99; 358/111
[58] Field of Search ........................... 358/111; 378/99

[56] References Cited

U.S. PATENT DOCUMENTS 4,228,465  1/1980  Stone et al.
4,355,330  12/1982  Fukui
4,449,195  10/1984  Andrews et al.
4,496,985  7/1985  Jensen et al.
4,571,619  2/1986  Mewitz 4,733,313  3/1988  Iyumita ............................... 358/111

Primary Examiner—Craig E. Church
Attorney, Agent, or Firm—Watts, Hoffman, Fisher & Heinke Co.

[57] ABSTRACT

A system and method using television for x-ray radiographic imaging is disclosed. The disclosure is directed to circuitry and technique whereby digital information for defining blanking time and active time for a given television scan format is stored in read only memory circuitry. In operation, the system blanks unwanted data, producing for active display only a circular image of predetermined size and location. Additional read only memory is used as lookup tables to scale the circular image size, or to alter its shape symmetrically about a center line.

10 Claims, 4 Drawing Sheets

X-RAY TELEVISION IMAGING USING DIGITAL CIRCULAR BLANKING

TECHNICAL FIELD

This invention is generally directed to x-ray imaging employing a television imaging camera, and more particularly to improved circuitry and method for blanking unwanted data from the image by the use of digital circuitry.

BACKGROUND ART

Many x-ray imaging systems employ television for image generation. Such systems include an x-ray source for propagating x-rays through a patient to emerge from the patient's body in a pattern bearing information relating to the internal structure or condition of the patient's body. An image intensifier tube is positioned opposite the source with respect to the patient, and receives the emergent pattern of x-rays incident on an input face of the intensifier tube. The image intensifier tube converts the x-ray image pattern to a visible light image corresponding to that pattern. The visible light image appears at a smaller, circular output face of the image intensifier tube.

A television camera is positioned so that its pickup tube views the circular visible image output from the image intensifier tube and converts the pattern of visible light distribution to an electrical video signal. The television camera also generates appropriate accompanying horizontal and vertical synchronization signals. The video and synchronization signals are presented together as an ensemble to a television monitor. The monitor reconverts the information carried by the signal ensemble to a second larger visible light image suitable for physician viewing for diagnostic purposes.

The circular image appearing at the intensifier tube output face is focused on the target of the television camera pickup tube by a system of lenses and mirrors which are sometimes generally referred to as an "optical cube".

"Circular blanking" is a term referring to an x-ray television system feature wherein the video image produced on the monitor is electronically blanked except for a circular area in the center of the picture. The desirability of circular blanking arises from the fact that the image produced at the output of the x-ray image intensifier tube is circular.

Radiographic imaging systems incorporating television are sometimes set up such that the television camera sweeps the intensifier tube target with its electron beam roughly tangent to the circular image focused on the target. In the absence of circular blanking, the edge of the television pickup tube target, sometimes known as the "ring", (which bears no image information) would image undesirably on the television monitor. This is at least aesthetically undesirable, and can result in distractions from normal use of the image for diagnostic purposes.

Circular blanking places the target ring, as well as other artifacts, outside the circular active imaging area, which results in a substantially noise free, or "clean", image.

Circular blanking has been achieved in prior art radiographic imaging systems by analog processing. In analog circular blanking, the blanking is done by sensing the attainment of certain voltages by ramp or other signals of non-zero slope.

An analog circular blanking circuit is keyed to the camera vertical and horizontal synchronization signals. Such circuitry generates vertical and horizontal rate parabolas with a series of integrators.

An alternative technique generates keyed parabolas using 4-quadrant multipliers. The parabolas are then summed and applied to the input of a comparator whose input is a mixed circular blanking signal for sensor cathode blanking, i.e., blanking of the electron beam produced by the television camera pickup tube to scan the target. In addition, another comparator along with an appropriate delay constant is used to produce a mixed video circular blanking signal. A third comparator can also be used in similar fashion to generate a circular sample window required by automatic gain control circuitry.

A known type of radiographic imaging system employing television is known as DIGICON 260 and is sold by Picker International, Inc. of Cleveland, Ohio, U.S.A. A known type of television camera employed in such a system is known as the BETA X, also sold by Picker International.

Many television cameras, including the BETA X, have capability for operation in any of a multiplicity of scan formats. The BETA X, for example, can operate in any one of four different scan formats. This camera therefore requires four different circular blanking set-ups to provide proper circular blanking for each format.

In practice, the result is a requirement for a circuit which has 28 adjustment potentiometers. The circuit cost and complexity and difficulty of set up are apparent.

Furthermore, the possibility exists for up to six scan formats from a single television camera, implying the need for even more adjustments. The analog adjustments required result in time consuming and expensive factory and field procedures.

The analog circuitry is also susceptible to circuit drift over time and temperature, resulting in undesirable size and shape changes in the active imaging area.

It has been proposed in Mewitz U.S. Pat. No. 4,571,619 (issued Feb. 18, 1986) to employ some digital circuitry for effecting circular blanking of an x-ray image at the television monitor display. This proposal incorporates two comparators and a two's complement adder. The proposal requires a computer for its operation, and is not well suited for real time on-line processing using circular blanking. Additionally, the Mewitz circuitry, involving multiple comparators and other components, tends to be complex and expensive.

It is a general object of the present invention to provide an x-ray imaging system employing a television monitor and including improved digital blanking circuitry for defining an active image area of adjustable size and shape, symmetric about an image centerline and having flexibility for applying circular blanking to both television camera tube and to the display monitor in a real time fashion, all with circuitry which is relatively simple and compact.

DISCLOSURE OF INVENTION

The disadvantages of the prior art are reduced or eliminated by the use of circuitry and technique for improved digital circular blanking in x-ray imaging systems.

A system constructed in accordance with the present invention includes an x-ray source for propagating x-rays along a path and a detector aligned in the path which responds to receipt of an incident pattern of x-rays to produce a substantially circular visible light image corresponding to the received pattern. A television camera views the light image output and produces video and synchronization signals representing that image. A monitor responds to a television signal ensemble to produce a larger visible light image corresponding to the x-ray pattern.

Circuitry is coupled to both the monitor and the television camera to blank scanning operation of both the television camera pickup tube and the monitor cathode ray tube to define two active image areas, blanking the remainder of the television camera field of view and the monitor image.

In accordance with a more specific embodiment of the invention, the active viewing area defined by the unblanked portion of the monitor image corresponds to a slightly smaller diameter circular area of the x-ray pattern than does the blanked circular area of the television camera pickup tube field of view. This embodiment assures that none of the television camera components, such as the ring surrounding the target, shows up as an artifact in the unblanked portion of the image appearing on the monitor face.

In accordance with a more specific embodiment, the digital circuitry for producing a blanking signal comprises a single comparator and phase lock loop circuitry.

The phase lock loop circuitry includes a phase comparator, a low pass filter, a voltage controlled oscillator, and a divide by N counter.

In accordance with a more specific embodiment, read only memory circuitry is utilized to store a single digital representation for determination of the blanking and unblanking points for each raster line of an image to be presented in circular blanked format.

In more specific embodiments, multiple read only memories can be used, each one storing the blanking and unblanking location information in digital form for a different sized or shaped active viewing area.

In accordance with still another specific embodiment, the active viewing area can be non-circular and symmetrical about a vertical center line.

Other details of the present invention will be understood with reference to the following detailed description and to the drawings.

BEST MODE FOR CARRYING OUT INVENTION

Figure 1:
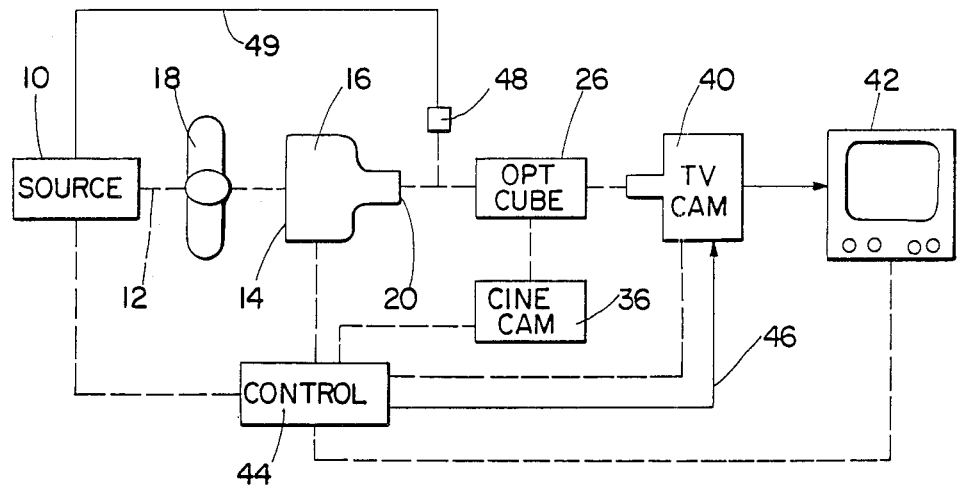
FIG. 1 is a block diagram of an x-ray imaging system incorporating the present invention.

FIG. 1 illustrates in block form a multi-mode x-ray radiographic imaging system incorporating the present invention. The system of FIG. 1 includes a source 10 for producing x-rays which are propagated along a path 12 toward an input face 14 of an image intensifier tube 16.

The image intensifier tube 16 is sufficiently spaced from the source 10 and aligned in the beam path to accommodate the location between the source and the image intensifier tube of a patient or subject 18. X-rays from the source pass through the patient and the emergent pattern is incident upon the input face 14 of the image tube 16. The image tube 16, of known variety, produces at an output face 20 a circular visible light image corresponding to the pattern of x-rays incident upon the input face 14.

Downstream from the image intensifier tube output face 20, a lensing system, sometimes called an "optical cube" 26, is provided to receive the output face image.

A television camera head 40 is aligned to receive the light image via the optical cube 26. The television camera 40 includes a television pickup tube having a target supported by a ring about its periphery, and an electron gun. The camera 40 also includes circuitry and apparatus for causing the beam of electrons from the gun to scan the target at any of a predetermined number of scan rates, and field scanning modes or formats, such as interlaced and sequential. The scanning takes place in known fashion in accordance with a square or rectangular array of parallel raster lines.

The television camera 40 has a television camera head 40a (FIG. 2) that includes preamplifiers and a sweep generator, yoke, camera tube lens and an iris in front of the lens. The camera head is embodied by a Model BETA X, available commercially from Picker International, Inc., of Cleveland, Ohio, U.S.A.

The television camera 40 performs as a fluoro device. In the fluoro mode, the television camera receives light output from the output face 20 of the image intensifier tube and produces a video signal representing the light distribution of the viewed image, along with appropriate horizontal and vertical synchronization signals.

The television camera also includes adjustable gamma, iris and other settings, which afford the capability of operation in different scan formats.

The video and synchronization signals are transmitted to a monitor 42 and produce on the face of the monitor a visible continuous real time image of the output image of the image intensifier tube 16.

Details of an x-ray diagnostic imaging system employing a television imaging chain for multi-mode operation are set forth in Plut et al., U.S. Pat. Nos. 4,677,477, issued on June 30, 1987, which patent is hereby expressly incorporated by reference.

A radiographic image system controller 44 coordinates operation of the FIG. 1 systems. A control output 46 from the controller 44 sends video operation parameters to the camera's image processing system 110 depicted in FIG. 2. The control output 46 conveys information concerning scanning rate and automatic gain control selection to an electronics interface 112.

The interface 112 provides four binary output signals on paths 114–117. The signal path 117 transmits an automatic gain control signal to a video processor 130. Automatic gain control integrates a selected portion of the video image to automatically normalize the signal applied to the viewing monitor. Analog AGC systems are known and the image processing system 110 provides a digital AGC on/off selection.

The remaining three signal paths 114–116 output from the interface 112 are coupled to a synchronization signal generator 120 for generating video synchronization signals. A digital circular blanking circuit 122, a camera tube control voltage circuit 124, and a vertical sweep and focus control circuit 126 also utilize signals provided on the three paths 114–116.

Figure 3A:
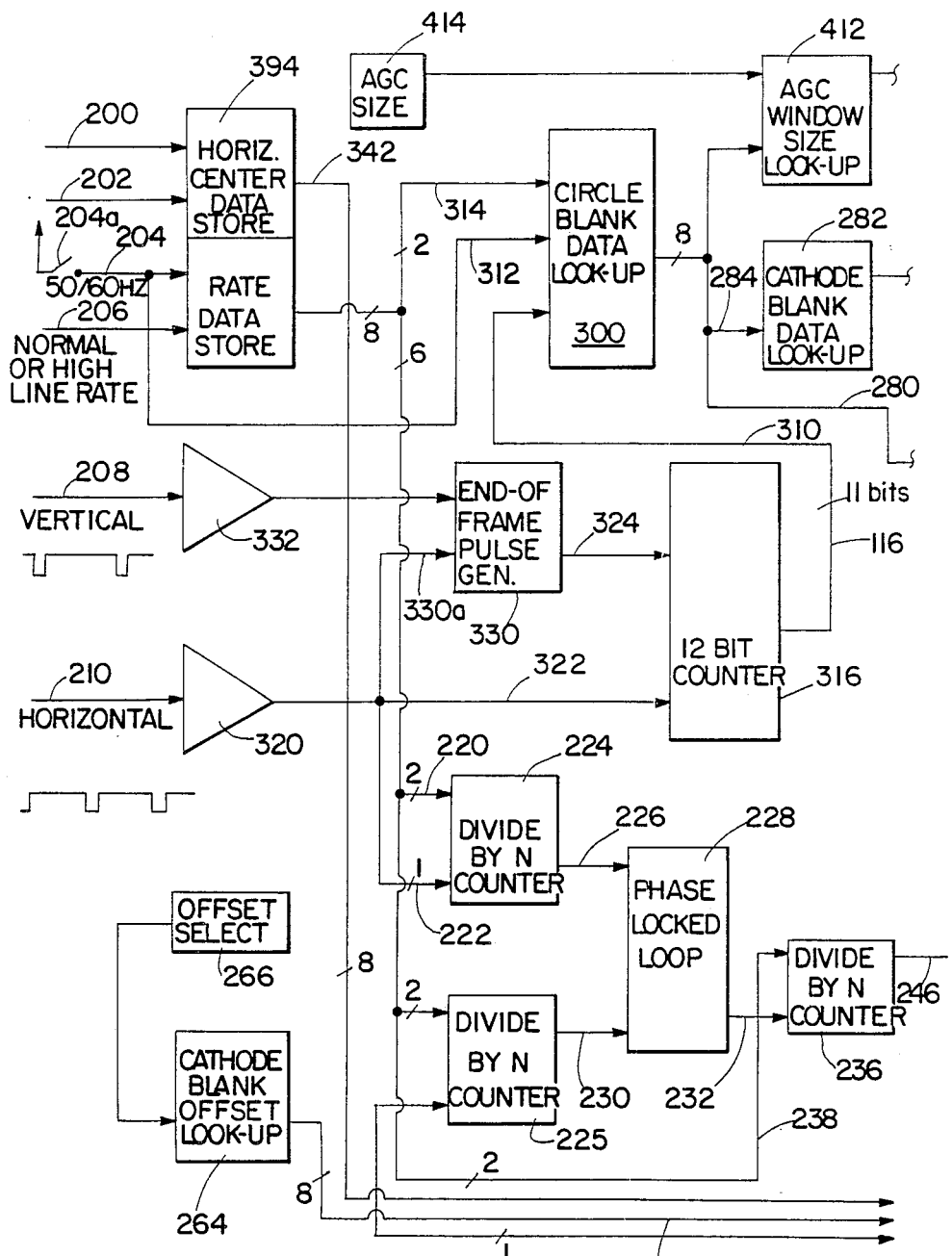
FIGS. 3A and 3B are more detailed block diagrams illustrating a digital circular blanking generator.
Figure 3B:
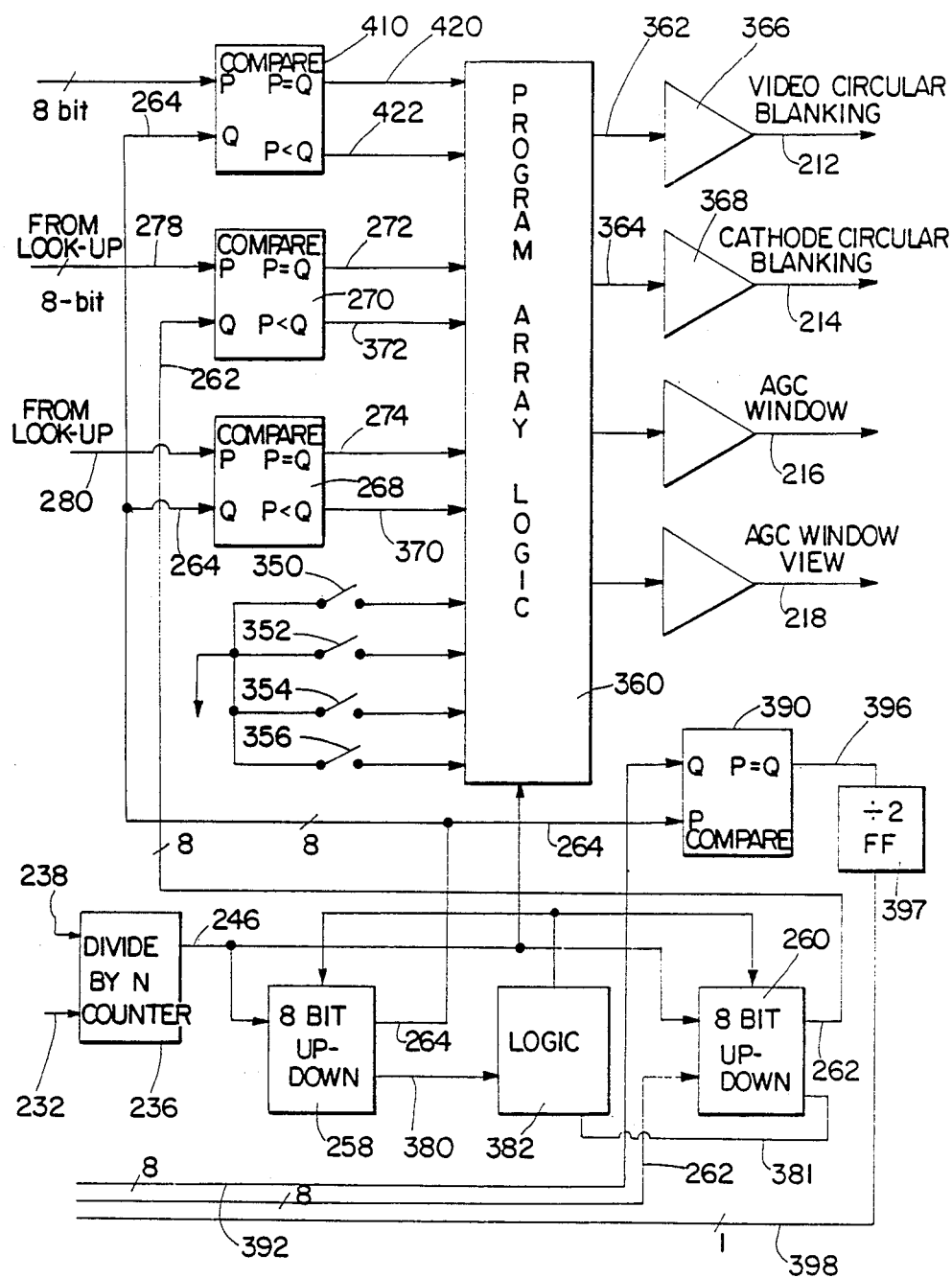

FIGS. 3A and 3B are more detailed diagrams of the digital circular blanking circuit 122. As shown in FIGS. 3A and 3B, the circuitry 122 includes several inputs from the interface 112 (and the sync generator 120) and outputs for the video processor 130 and camera head 40a.

Inputs relating to determination of television camera scan rate formats appear at inputs 200, 202, 204, 206. Each of these inputs is a one bit binary signal, and together they indicate which of a scan rate formats has been selected for television camera operation. The scan rate formats can differ in the number of lines, in whether the field is interlaced or sequential, and in the frame or field repeat rate. In the present embodiment, a television camera having four different scan rate formats as determined by the two inputs 200,202 is used. A user selectable switch 204a controls whether an AC power input 204 represents 50 or 60 hertz power for the system. The input 206 presents a one bit signal that selects either a normal or high line scan rate format.

Figure 4:
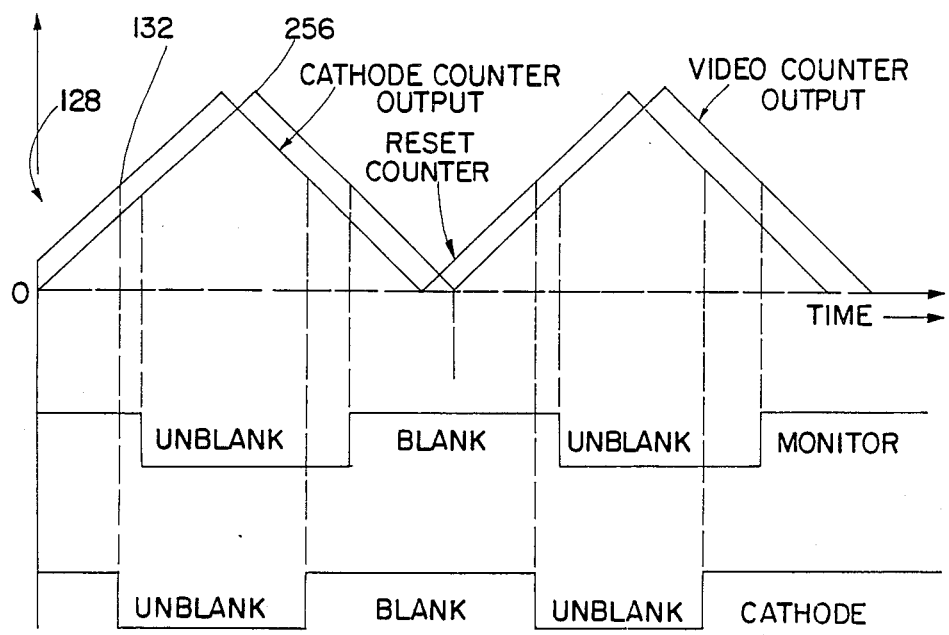
FIG. 4 is a timing diagram showing the count of two up/down counters used in controlling the generation of blanking signals for a television monitor and a cathode tube of a camera.

Other inputs to the digital blanking circuitry shown in FIG. 4 include a vertical drive signal appearing at an input 208, and a horizontal drive signal appearing at an input 210. The vertical and horizontal synchronization signals are generated by the sync generator 120. A negative pulse appears at the vertical drive input 208 at the beginning of each new field. A negative pulse appears at the horizontal drive input 210 at the beginning of each new line.

The digital circular blanking circuitry 122 of FIG. 3B has several outputs. A video circular blanking signal appears at a lead 212, and a cathode circular blanking signal appears at a lead 214. Each of the video circular blanking and cathode circular blanking signals can assume one of two digital states. As an example, when the video circular blanking at the output 212 signal is "high" the output monitor screen is blanked. Normally, these two signals assume the same states virtually, but not always exactly, in unison, as will be described in more detail below. The state of the video circular blanking signal at the output 212 controls a video gain amplifier in a video processor circuit 130 (FIG. 2) which gates on or off the video directed to the television monitor, depending on the state of the signal at the output 212. The signal at the output 214 determines the cathode electrical potential and effectively gates on or off the electron gun of the camera pickup tube.

Two other outputs, at the leads 216, 218 govern the blanking of the AGC window. The AGC window defines a circular unblanked window, about 50 per cent of the diameter of the main digitally unblanked window. The signal at the output 216 is to establish the operation of the automatic gain control circuitry in the video processor of the television camera. The signal appearing at the output 218, which is herein referred to as the AGC window view signal, displays the AGC window on the monitor and allows the operator to determine the size of the window.

A phase lock loop circuit 228 (FIG. 3A) and three associated divide by N circuits produce a clock output signal having a frequency which determines how fast downstream counter circuitry (discussed below) operates. The speed of operation of the downstream counter circuitry determines the size of the digitally unblanked area of the image. The phase lock loop circuit 228 and divide by N circuits produce this output clock signal at a frequency which remains in phase with the horizontal drive signal 210 from the sync generator 120. The frequency of this clock signal is a function of the scan rate operating format selected for the television camera.

More specifically, a two bit binary signal defining the particular scan rate television camera operating format, appearing at inputs 220 and 202, and the horizontal drive signal, appearing at an input 222, are presented as inputs to a divide by N counter 224. The counter 224 is of known type, and functions to divide the frequency of the horizontal drive signal at the input 222 (30 kilohertz, for example) by a number N which is a function of the value of the signal appearing at leads 220 and 202. The result, which appears at an output 226, is a signal having a constant frequency, the frequency being that of the horizontal drive divided by a number N.

The horizontal drive signal divided by N appearing at the output 226 is presented as an input to a phase locked loop circuit 228. Another input to the phase locked loop circuit 228, appearing at a input 230, represents a second horizontal synchronization signal from a counter 225 that triggers the phase lock loop. The phase locked loop, consisting of a phase comparator, low pass filter and oscillator, adjusts an oscillator output 232 such that the phase and frequency of input 230 matches those of input 226, in known fashion.

The output 232 from the phase locked loop circuit 228 is a constant frequency signal directed over a lead to another divide by N counter 236. A two bit input 238 to the counter 236, is a representation of the particular scan format selected. The counter 236 divides the phase locked loop output to obtain an output 246 having a frequency approximately equal to the horizontal drive frequency multiplied by N', where N' is a function of the scan format selected. As an example, one output 246 of the counter 236 would be a series of 512 pulses for each horizontal sync pulse appearing at the input 222.

The clock signal at the lead 246 is directed to a pair of 8-bit digital up/down counters 258, 260 (FIG. 3B). Each of the up/down counters 258, 260 responds to individual clock pulses to count, beginning at a preset value that can be zero, up to 255 and back down to zero. The counter 260, is associated with generation of the cathode circular blanking signal for the TV camera, while the counter 258 is associated with generation of the video monitor blanking signal.

The counter 260, in addition to receiving the clock signal 246 also receives an eight bit offset control signal at an input 262. The offset signal is a digital binary number indicating an amount of counts by which the counter 260 is to be offset with respect to counter 258 in its counting operation.

The signal at the lead 262 is produced as an output of a lookup table 264 (FIG. 3A). The lookup table 264 is a PROM, and is controlled by a manual set of inputs 266.

In operation, when both the cathode of the television camera pickup tube and the video output are sought to be blank, it is sometimes necessary because of delays induced by cable length associated with the television camera to slightly offset the camera tube blanking with respect to the monitor, or video, blanking. This is necessary so that the circular active areas defined by both means of blanking can be adjusted to remain concentric under all circumstances.

The length of television camera cabling extending to the camera pickup tube introduces enough delay in the control timing of the active viewing area to offset, or misalign the two active image areas with respect to one another. The offset adjustment at the selector 266 allows the operator to eliminate this problem.

An eight bit output 262 of the up/down counter 260 is transmitted to an 8-bit comparator 270. An eight bit output 264 of the up/down counter 258 is transmitted as an input to an 8-bit comparator 268. Each of the comparators 268, 270 produces an output, respectively at leads 272, 274 that can assume one of two binary states.

The output of each comparator will remain in a first state until the count received from its associated up/down counter input has reached a predetermined value presented at two comparator inputs 278, 280. The comparators' output will then remain at its other state until the comparator has counted to its peak of 255, and back down to the predetermined value at which time the comparator output will revert to its first state. As an example, if the predetermined value at the input 278 to the comparator 270 is 128, the comparator 270 will produce a first output state until its associated up/down counter 260 has counted to 128, at which time the output will assume its other state. The up/down counter 260 will continue to count up to its maximum of 255 and then down again until it reaches 128 once more. At this time, the comparator output will again change from its other state to its first state until the counter has again counted back to zero and ramped back to 128.

The eight bit signal appearing at the input 278 is produced as an output of a cathode blanking lookup table 282 (FIG. 3A). The lookup table 282 is a PROM circuit which produces a predetermined binary output in response to a predetermined 8-bit binary input at an input 284. The signal at the input 280 is produced by a lookup table 300 which is also PROM circuitry similar to that described as constituting the lookup table 282.

The output from the lookup table 300 is dependent upon an eleven-bit address input 310 and two format inputs 312, 314 to the lookup table 300. The input 11-bit binary number input 310 indicates to the lookup table 300 which of the scan lines is being displayed on the television monitor. To generate this information, the series of pulses at the horizontal drive input 210 is buffered through a buffer 320 and coupled as a clock input 322 to a twelve bit counter 316.

A second input 324 to the counter 316 is generated by a one-shot circuit 330 which produces a pulse output at the end of each video frame. When the one-shot 330 receives coincident horizontal and vertical drive signal from buffers 320 and 332, it generates a pulse output indicating the counter 312 should reset to the first line within a scan frame.

The line indication on the input 310 and the format information on the inputs 312, 314 indicate where in the lookup table 300 the unblank and blanked signal are located for a particular line. This data is preprogrammed and stored in the lookup table 300 and not user adjustable. One 8-bit output 280 from the lookup table is coupled directly to the comparator 268. The function of the comparator 268 is to compare this 8-bit signal to the 8-bit signal received from the counter 258. When a correspondence between the two input signals exists, the output 274 from the comparator 268 changes state indicating the video information provided from the camera is to be displayed on the monitor.

The lookup table 282 is interposed between an output 284 from the lookup table 300 and the comparator 270 used to control blanking of the camera. As noted above, one object of the invention is to allow the unblanking and blanking signals to be chosen differently between the monitor input and the camera output. The lookup table 282 takes the 8-bit output from the lookup table 300 and scales that output to generate a slightly larger number, for example, and presents that sealed number as an input 278 to the comparator 270. Thus, the comparator 270 uses a slightly different number to produce the output 272 used to control unblanking and blanking of the camera tube.

Figure 2:
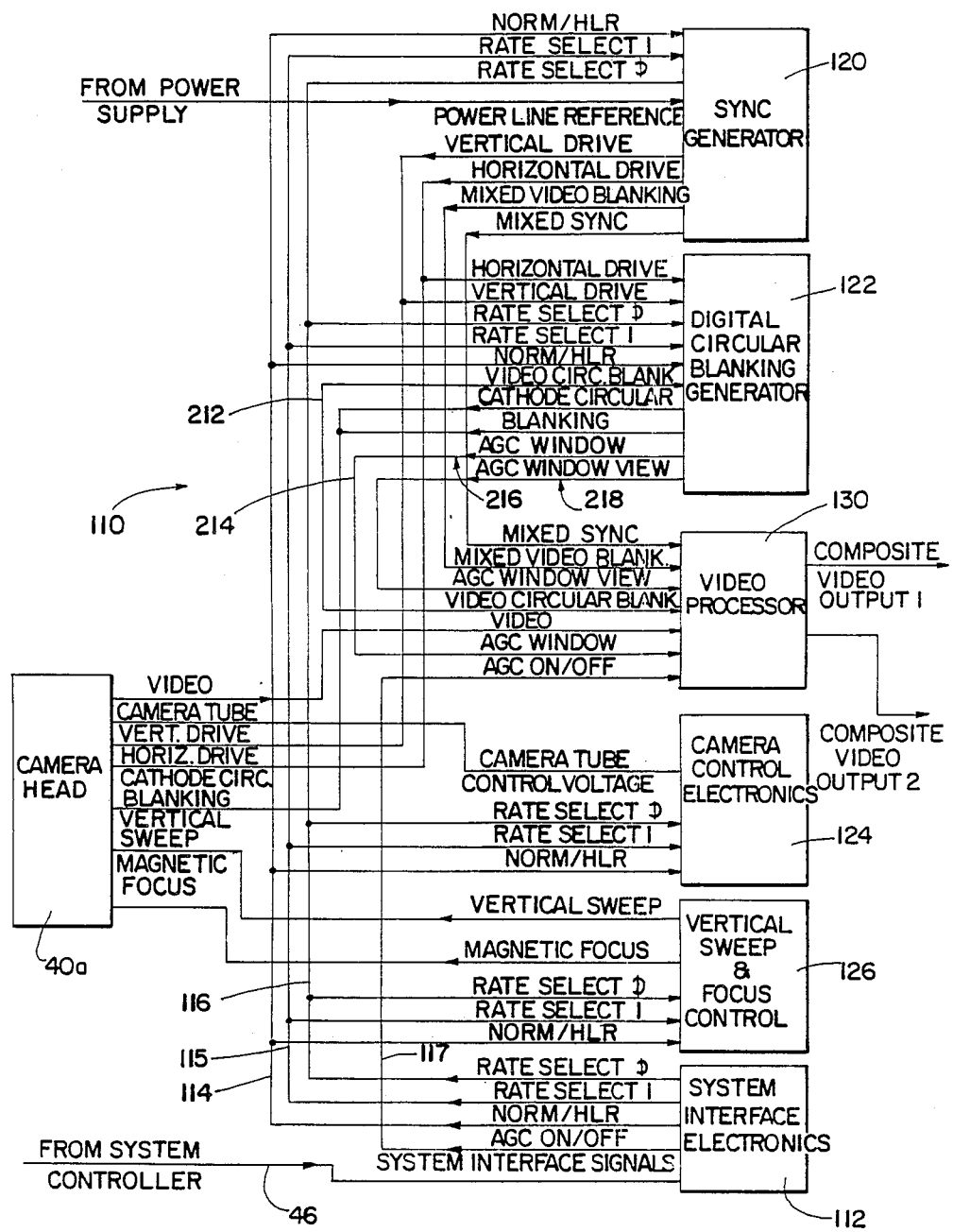
FIG. 2 is a generalized block diagram illustrating a portion of the system of FIG. 1 and its relationship to the present invention.

Turning to FIG. 3B, four user selectable switches 350, 352, 354, 356 are coupled to a programmable array logic (PAL) 360 having outputs 362, 364, for driving two buffer amplifiers 366, 368. The output from these two amplifiers are coupled to the video processor 130. (FIG. 2). A high output from a buffer amplifier blanks the video signal and a low output unblanks the video signal. When the user selectable switch 350 is closed, cathode blanking on the output 214 is selected. When the switch 352 is closed, video blanking at the output 212 is selected.

During system set up, the user must choose a particular setting of the offset input from the control 266 (FIG. 3A). To accomplish this setup, the user closes the switch 354 to the PAL 360. In this mode, two outputs 370, 372 from the comparators 268, 270 are also used in generating the outputs 212, 214. In this mode, rather than blanking those portions of the video and cathode signals above and below the comparator inputs, the video blanking occurs only at those times when the input from the counters 258, 260 and lookup table inputs 278, 280 are the same. This produces two circles on the monitor representing the edges of the cathode blanking and video blanking which may or may not be concentric. By user adjustment of the input 266, these two circles on the monitor are made concentric by adjustment of the preset count to the counter 260.

Returning to FIG. 3B, an output 380 from the up/down counter 258 is used to synchronize the two counters, 258, 260. When the up/down counter 258 is counting down and reaches the zero count, the output 380 goes high and causes a logic circuit 382 to load the counter 260 with a specified offset. Since the counter 258 has no offset, this results in a resetting of a counter 258.

In addition, the logic circuit 382 toggles the count direction of each counter 258, 260 when outputs 380 and 381 go high respectively. These outputs go high when a counter reaches zero when counting down or 255 when counting up.

The 8 bit count signal 264 from the counter 258 is coupled as one input to a comparator 390. A second input 392 to the comparator 390 originates from a table lookup circuit 394 (FIG. 3A) that contains the screen center data for a particular viewing format. A comparator output 396 comprises a one-bit high or low output used as the feedback to the phase lock loop circuit 228.

The frequency of the output 396 is twice the horizontal sweep frequency of the monitor since the comparator inputs 264, 392 are equal once during the up count phase and once during the down count phase, each occurring once per horizontal sweep. The output 396 is applied to flip-flop 397 whose output 398 is used to clock the divide by N counter 225. Both counters 224, 225 receive inputs of the same frequency which are divided by factors dependent on the imaging format and presented to the phased lock loop 228. The output 232 from the loop phase synchronizes the counters with horizontal drive sync input.

The digital blanking circuit 122 also generates signals used by the automatic gain circuitry in the video processor 130. The technique for generating these signals is similar to that used in generating the video and circular blanking signals 212 214. The output 264 from the up/down counter 258 is coupled to an additional comparator 410 having an 8 bit input from a lookup table 412. An automatic gain control size input 414 causes the automatic gain lookup table 412 to scale the output from the digital blank lookup table 300. Two outputs 420, 422 from the comparator 410 are used by the PAL 360 in generating the automatic gain control window signal 216 and the automatic gain control window view signal 218. By closing a switch 356 coupled to the PAL 310, the automatic gain control window view signal 218 utilizes these two outputs 420, 422 to generate a signal for displaying the region bounded by the automatic gain control on the television monitor. The automatic gain control window signal 216 for implementing automatic gain control in the monitor video processor 130 is generated regardless of the state of the switch 356.

Turning now to FIG. 4, two output signals from the counters 258, 260 are depicted on a time base starting at a point wherein the up/down counter 258 has reached zero. The output from this counter 258 therefore starts counting up from zero and ramps up to a maximum of 256. The output from the second counter 260 begins at a value other than zero and ramps at the same rate up to its maximum value 256. On each counter cycle, a different value can be loaded into the counter 260 but after calibration of the digital blanking for the monitor and cathode via the input 266, this number typically remains unchanged during operation.

As noted in FIG. 4, once the counter 258 reaches the value output by the digital lookup table 300, the video circular blanking signal at the output 212 changes state causing the signal composite video output presented to the television monitor to be unblanked. In the FIG. 4 depiction the transition value for unblanking the monitor is chosen to be 128, i.e., midway along the counter output as it ramps up to 256. Typically, a different value will be output from the cathode blank lookup table 282 and therefore the transition state for the cathode blanking signal 214 is a different value, resulting in a slightly larger area of cathode blanking. In FIG. 4, this value is chosen to be 132 to cause this slightly greater blanked input portion. FIG. 4 also illustrates that the cathode blanking occurs prior to the monitor blanking so that as this signal is propagated to the remotely located camera head it takes into account delays in transmission. As noted above, the amount of delay is empirically determined by the system operator and used to select an appropriate offset by the input 266.

The blank and unblank signals are presented at the outputs 212, 214 and transmitted to the video processor 130 (FIG. 2) and camera head 40a to dictate image blanking to the monitor 42 and camera 40.

The present invention relating to digital blanking has been described with a degree of particularity. It is the intent, however, that the invention include all modifications and alterations from the disclosed design falling within the spirit or scope of the appended claims.

I claim:

1. An x-ray imaging system comprising:
   (a) an x-ray source for propagating x-rays along a beam path;
   (b) an x-ray detector aligned with the beam path for receipt of incident patterns of x-rays, said detector producing a substantially circular visible light image corresponding to said x-ray pattern at an output face;
   (c) a television camera positioned to view said output face and to produce a television signal ensemble including video and synchronization signals representing the viewed output face;
   (d) a monitor coupled to the television camera and responsive to the television signal ensemble to produce a larger visible light image corresponding to said x-ray pattern; and
   (e) a digital video blanking circuit coupled to said monitor and to said television camera to effect blanking of said monitor produced image except in a substantially circular active viewing area by control of said monitor cathode ray tube and for blanking operation of said television camera except corresponding to a substantially circular active viewing region of said television camera field of view, said digital video blanking circuit including:
      (i) a memory device for storing a monitor blanking transition position for each of a plurality of monitor scan lines;
      (ii) a scaling circuit for converting the monitor blanking transition position to a cathode blanking transition position;
      (iii) a counter for counting to a maximum value and then back down to a minimum value during each scan line at a rate dictated by the synchronization signals from the television camera;
      (iv) a first comparator for comparing an output from the counter to a signal from the memory device representing the monitor blanking transition position to start and stop blanking of the monitor; and
      (v) a second comparator for comparing an output from the counter to a signal from the scaling circuit representing the cathode blanking transition position to start and stop blanking of the television camera.

2. The system of claim 1, wherein:
said scaling circuit defines the active viewing area of said monitor to cover slightly less than the corresponding image portion encompassed by the unblanked active viewing region of said television camera.

3. The imaging system of claim 1 wherein the digital video blanking circuit further comprises a second counter activated to count up and down at a rate dependent on the synchronization signals from the television camera coupled to said second comparator for imposing a time difference between the cathode and monitor blanking to account for propagation delays in receipt of blanking signals by either the monitor or the television camera.

4. An x-ray imaging system comprising:
   (a) a source for propagating x-rays along a beam path;
   (b) an x-ray detector responsive to incident x-rays and positioned in said path, said detector producing at an output face a first visible light image corresponding to the received x-ray pattern;
   (c) a television camera positioned to view said output face and including means for producing video and synchronization signals describing said first visible light image;

(d) a monitor responsive to said video and synchronization signals for producing a second visible light image corresponding to said first visible light image; and (e) circuitry, including digital blanking circuitry for blanking said second visible light image except in a generally central active viewing region, said digital blanking circuitry comprising:

(i) a counter synchronized with the synchronization signals from the television camera to count to a maximum and back to a minimum value once for each scan line of the camera;

(ii) a memory circuit to store a blank/unblank transition point for each of a plurality of scan lines; and (iii) a comparator having a comparator output coupled to the monitor to compare a signal from the memory circuit representing the blank/unblank point of each scan line with an output from said counter to transmit a signal to the monitor that changes state to generate a sequence of unblank signals to define the central active viewing region of the second visible light image.

5. The system of claim 4, wherein:
said digital blanking circuitry further comprises phase lock loop circuitry to co-ordinate the counter with the television camera synchronization signals.

6. The system of claim 5, wherein said phase lock loop circuitry comprises:
(a) a phase comparator;
(b) a low pass filter, and
(c) a voltage controlled oscillator divide by N counter comprising an up/down counter.

7. An x-ray imaging method comprising the steps of:
(a) propagating x-rays along a beam path;
(b) converting a pattern of said propagated x-rays to a visible light image corresponding to said pattern;
(c) viewing said visible light image with a television camera to produce video and synchronization signals representing said viewed image;
(d) converting said video and synchronization signals to a second visible light image by the use of a monitor, and
(e) blanking both a portion of said television camera field of view and of said monitor image by the use of blanking circuitry including digital circuitry to define an active area of television camera operation and an active area of monitor operation.

8. The method of claim 9, further comprising the step of:
said blanking step comprising blanking more of said monitor image than of said television camera field of view.

9. The method of claim 9 wherein said blanking step comprises the substeps of:
(a) storing a blank/unblank transition position for each scan line of the monitor image;
(b) converting the blank/unblank position into a digital representation of said position;
(c) comparing the digital representation with a time varying signal that increases to a maximum and decreases to a minimum for each scan line;
(d) generating an unblank signal when the time varying signal and digital representation are the same; and
(e) generating a blank signal once the time varying signal and digital representation are the same at a later portion of the scan line.

10. An x-ray radiographic imaging system comprising:
(a) a source for directing x-ray energy along a path;
(b) an image intensifier tube aligned in the path for producing at an output face a visual light image corresponding to a pattern of x-rays received incident upon an input face of said image intensifier tube;
(c) a television camera positioned to view said visible light image at said output face of said image intensifier tube, said television camera including a television pick-up tube and circuitry for producing electrical video and horizontal and vertical synchronization signals representing the viewed visible light image as a pattern of raster lines in accordance with a selected one of a plurality of scan formats;
(d) a monitor coupled to receive said video and synchronization signals for producing in response thereto a second visible light image corresponding to said x-ray pattern;
(e) a read only memory containing stored digital information defining for each raster line of said image for a given scan format the approximate blanking and active time required to form a circularly blanked video image;
(f) a line counter synchronized to said vertical synchronization signals from said television camera and responsive to horizontal synchronization signals to increment one count per raster line and additionally having means to reset said counter to zero upon the tracing of the first raster line of the scan, and
(g) at least one additional read only memory containing stored digital information for rendering said read only memory as a look-up table for scaling the size of said active viewing area.

* * * * *

UNITED STATES PATENT AND TRADEMARK OFFICE
CERTIFICATE OF CORRECTION

PATENT NO. : 4,884,291

DATED : November 28, 1989

INVENTOR(S) : David Nicolay

It is certified that error appears in the above-identified patent and that said Letters Patent is hereby corrected as shown below:

Column 11, line 54, "claim 9" change to --claim 7-- ;

Column 12, line 4, "claim 9" change to --claim 7--.

Signed and Sealed this

Sixteenth Day of July, 1991

*Attest:*

HARRY F. MANBECK, JR.

*Attesting Officer*  *Commissioner of Patents and Trademarks*